(12) United States Patent
Stroot et al.

(10) Patent No.: US 7,655,143 B2
(45) Date of Patent: Feb. 2, 2010

(54) CARBON DIOXIDE STIMULATION OF NITRIFICATION IN ACTIVATED SLUDGE REACTORS

(75) Inventors: Peter G. Stroot, Lutz, FL (US); Lina Posso-Blandon, Orlando, FL (US); Raymond A. Morris, Lakeland, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 11/832,057

(22) Filed: Aug. 1, 2007

(65) Prior Publication Data

US 2008/0029454 A1 Feb. 7, 2008

Related U.S. Application Data

(60) Provisional application No. 60/821,051, filed on Aug. 1, 2006.

(51) Int. Cl.
*C02F 3/00* (2006.01)
(52) U.S. Cl. ..................................................... 210/620
(58) Field of Classification Search ................. 210/614, 210/620, 621–624, 749, 739, 743
See application file for complete search history.

(56) References Cited

U.S. PATENT DOCUMENTS

| | | | | |
|---|---|---|---|---|
| 4,818,407 A | * | 4/1989 | Bogusch | 210/614 |
| 5,019,266 A | * | 5/1991 | Soeder et al. | 210/605 |
| 5,514,264 A | * | 5/1996 | Shane | 210/96.1 |
| 5,656,059 A | * | 8/1997 | Monster et al. | 71/7 |
| 5,849,192 A | * | 12/1998 | Jagush et al. | 210/610 |
| 6,159,371 A | * | 12/2000 | Dufay | 210/602 |
| 6,241,897 B1 | * | 6/2001 | Hanson et al. | 210/739 |
| 6,372,137 B1 | | 4/2002 | Bounds | |
| 6,569,334 B1 | * | 5/2003 | Yoneda | 210/610 |
| 6,893,567 B1 | * | 5/2005 | Vanotti et al. | 210/605 |
| 7,014,763 B2 | * | 3/2006 | Johnson et al. | 210/295 |
| 2008/0006587 A1 | * | 1/2008 | Cumming et al. | 210/756 |
| 2008/0164196 A1 | * | 7/2008 | Sumino et al. | 210/205 |

OTHER PUBLICATIONS

Denecke, "Effect of carbon dioxide on nitrification rates," Bioprocess Biosyst Eng,. Jan. 2003;25(4):249-53. Epub Nov. 26, 2002), http://www.ncbi.nlm.nih.gov/pubmed/14505004.*

(Continued)

*Primary Examiner*—Chester T Barry
(74) *Attorney, Agent, or Firm*—Thomas E. Toner; Smith & Hopen, P.A.

(57) ABSTRACT

A method of stimulating nitrification at low SRT by elevating $pCO_2$ during aeration is disclosed. The improvement on solids settling performance when elevated $pCO_2$ was supplied after 2 hours within the React cycle is consistent with the previous results that identified inorganic carbon as a potential remedy to poor settling and bulking sludge problems in activated sludge systems. Elevated $pCO_2$ increases the concentration of carbon dioxide and lowers the pH, which improve nitrification. The specific growth rate of nitrifying bacteria is sensitive to $pCO_2$, pH, and dissolved oxygen (DO). The DO is a function of the aeration rate. Elevating the $pCO_2$ and lowering the aeration rate provides conditions for nitrification rates that are comparable to conventional systems. However, the lower aeration rate yields significant energy cost savings.

18 Claims, 7 Drawing Sheets

OTHER PUBLICATIONS

Wett, B., and Rauch, W. (2003). "The role of inorganic carbon limitation in biological nitrogen removal of extremely ammonia concentrated wastewater." Water Res, 37(5), 1100-10.

Wett, B., Eladawy, A., and Becker, W. (2003). "Carbonate addition—an effective remedy against poor activated sludge settling properties and alkalinity conditions in small wastewater treatment plants." Water Sci Technol, 48 (11-12), 411-7.

Byong-Hee, J., Yasunori, T., and Hajime, U. (2000). "Stimulating Accumulation of Nitrifying Bacteria in Porous Carrier by Addition of Inorganic Carbon in a Continuous-Flow Fluidized Bed Wastewater Treatment Reactor." J. Biosci Bioeng, 89(4), 334-39.

Melcer, H., P.L. Dold, R.M. Jones, C.M. Byue, I. Takacs, H.D. Stensel, A.W. Wilsoon, P. Sun, and S. Bury "Methods for Wastewater Characterization in Activated Sludge Modeling." Water Environment Research Foundation (2003), Report # 99-WWF-3.

Dagley, S., and Hinshelwood, C. N. (1938). "Physicochemical Aspects of bacterial Growth. Part II. Quantitative dependence of the Growth Rate of Bact. Lactis aerogenes on the Carbon Dioxide Content of the Gas Atmosphere." J. Chem. Soc.

Davoli, D., Madoni, P., Guglielmi, L., Pergetti, M., and Barilli, S. (2002). "Testing the effect of selectors in the control of bulking and foaming in full scale activated-sludge plants." Water Sci Technol, 46(1-2), 495-8.

Denecke, M., and Liebig, T. (2003). "Effect of carbon dioxide on nitrification rates." Bioprocess Biosyst Eng, 25(4), 249-53.

Gordon, L., and Paskins, A. (1982). "Influence of High Partial Pressure of Carbon Dioxide and/or Oxygen on Nitrification." J. Chem Tech, 32, 213-23.

Green, M., Ruskol, Y., Shaviv, A., and Tarre, S. (2002). "The effect of CO2 concentration on a nitrifying chalk reactor." Water Res, 36(8), 2147-51.

Jetten, M. S., Cirpus, I., Kartal, B., Van Niftrik, L., Van De Pas-Schoonen, K. T., Sliekers, O., Haaijer, S., Van Der Star, W., Schmid, M., Van De Vossenberg, J., Schmidt, I., Harhangi, H., Van Loosdrecht, M., Gijs Kuenen, J., Op Den Camp, H., and Strous, M. (2005). "1994-2004: 10 years of research on the anaerobic oxidation of ammonium." Biochem Soc Trans, 33(Pt 1), 119-23.

Jirka, A. M., and Carter, M. J. (1975). "Micro semi-automated analysis of surface and wastewaters for chemical oxygen demand." Anal Chem, 47(8), 1397-1402.

Kinsbursky, R. S., and Saltzman, S. (1990). "CO2-Nitrification Relationships in Closed Soil Incubation Vessels." Soil Biol Biochem, 22(4), 571-572.

Metcalf & Eddy, I. (2003). Wastewater Engineering: Treatment and Reuse., McGraw-Hill, New York, NY.

Mobarry, B. K., Wagner, M., Urbain, V., Rittmann, B. E., and Stahl, D. A. (1996). "Phylogenetic probes for analyzing abundance and spatial organization of nitrifying bacteria." Appl Environ Microbiol, 62(6), 2156-62.

Nielsen, P. H., De Muro, M. A., and Nielsen, J. L. (2000). "Studies on the in situ physiology of Thiothrix spp. present in activated sludge." Environ Microbiol, 2(4), 389-98.

Noutsopoulos, C., Mamais, D., and Andreadakis, A. D. (2002). "The effect of reactor configuration and operational mode on *Microthrix parvicella* bulking and foaming in nutrient removal activated sludge systems." Water Sci Technol, 46(1-2), 61-4.

Odintsova, E. V., Wood, A. P., and Kelly, D. P. (1993). "Chemolithoautotrophic growth of *Thiothrix ramosa*." Arch Microbiol, 160, 152-7.

Pitt, P., and Jenkins, D. (1990). "Causes and control of Nocardia in activated sludge." Res. J. Water Polln. Control. Fedn., 37(2), 151-62.

Sakairi, M. A., Yasuda, K., and Matsumura, M. (1996). "Nitrogen removal in seawater using nitrifying and denitrifying bacteria immobilized in porous cellulose carrier." Water Science and Technology, 34(7-8), 267-274.

Van Loosdrecht, M. C. M., Brandse, F. A., and DeVries, A. C. (1998). "Upgrading of Wastewater Treatment Processes for Integrated Nutrient Removal—The BCFS® Process." Wat Sci Tech., 37(9), 209-217.

Wagner, M., Rath, G., Koops, H. R, Flood, J., and Amann, R. (1996). "In situ analysis of nitrifying bacteria in sewage treatment plants." Water Science and Technology, 34(1-2), 237-244.

\* cited by examiner

CARBON DIOXIDE STIMULATION OF NITRIFICATION IN ACTIVATED SLUDGE REACTORS

CROSS-REFERENCE TO RELATED APPLICATIONS

This application claims priority from U.S. Provisional Application No. 60/821,05 filed on Aug. 1, 2006; which application is incorporated herein by reference.

FIELD OF INVENTION

This invention relates to methods of treating wastewater.

BACKGROUND OF THE INVENTION

Numerous methods of treating wastewater are known. The two prevalent methods include the use of suspended growth systems (SGS) and fixed-film systems (FFS). One type of SGS is the sequencing batch reactors (SBR), which are used for the treatment of wastewater such as sewage or output from anaerobic digesters or mechanical biological treatment facilities in batches. Oxygen is bubbled through the wastewater to reduce biochemical oxygen demand (BOD) and Chemical oxygen demand (COD) to make the wastewater suitable for discharge into sewers or for use on land.

While there are several configurations of SBRs the basic process is similar.

Generally, the SBR comprises at least two identically equipped tanks with a common inlet, which is used to alternate the flow of wastewater between them. The tanks have a "flow through" system. That is, with substantially untreated wastewater (influent) entering the tank at one end, and treated water (effluent) leaving the tank at the other. While one tank is in a substantially inactive (settle/decant) mode, the other tank is actively aerating and filling. At the inlet is a section of the tank known as the bio-selector. This consists of a series of walls or baffles which direct the flow either from side to side of the tank or under and over consecutive baffles. This helps to mix the incoming influent and the returned activated sludge, beginning the biological digestion process before the mixture enters the main part of the tank.

There are four stages to treatment. These stages include fill, aeration, settling and decanting. The aeration stage involves adding air, usually ambient, to the mixed solids and liquid either by the use of fixed or floating mechanical pumps or by blowing it into finely perforated membranes fixed to the floor of the tank. During this period the inlet valve to the tank is open and a returned activated sludge pump takes mixed liquid and solids from the outlet end of the tank to the inlet. This "seeds" the incoming sewage with live bacteria.

Aeration times vary according to the plant size and the composition/quantity of the incoming mixture. The addition of oxygen to the mixture encourages the multiplication of aerobic bacteria, which consume the nutrients. This process encourages the production of nitrogen compounds as the bacteria increase their number, a process known as nitrification.

In the settling stage, the sludge formed by the bacteria is allowed to settle to the bottom of the tank. The aerobic bacteria continue to multiply until the dissolved oxygen is exhausted. Conditions in the tank, especially near the bottom are now more suitable for the anaerobic bacteria to flourish. Many of these, and some of the bacteria which would prefer an oxygen environment, use nitrogen as a base element and extract it from the compounds in the liquid. This process, know as denitrification, consumes the nitrogen compounds created in the aeration stage.

As the bacteria multiply and die, the sludge within the tank increases over time. A waste activated sludge pump removes some of the sludge during the settle stage to a digester for further treatment. The quantity or "age" of sludge within the tank is closely monitored, as this can have a marked effect on the treatment process. The sludge is usually allowed to settle until clear water is on the top 20%-30% of the tank contents.

The decanting stage most commonly involves the slow lowering of a scoop or "trough" into the basin. This has a piped connection to a lagoon where the final effluent is stored for disposal to a wetland, tree growing lot, ocean outfall, or to be further treated for use on parks, golf courses etc.

Fixed-film systems (FFS) are biological treatment processes that employ a medium such as rock, plastic, wood, or other natural or synthetic solid material to a support biomass on its surface and within its, preferably, porous structure. At least two types of fixed-film systems may be considered those in which the medium is held in place and is stationary relative to fluid flow (trickling filter) and those in which the medium is in motion relative to the wastewater (e.g., rotating biological disk). A third classification includes dual-process systems that encompass both fixed and suspended biomass together or in series.

Trickling filter systems are typically constructed as beds of media through which wastewater flows. Oxygen is normally provided by natural or forced ventilation. Flow distributors or sprayers distribute the wastewater evenly onto the surface of the medium. As the wastewater moves by gravity through the medium, soluble and colloidal organic matter is metabolized by the biofilm that forms on the medium. Excess biomass sloughs from the medium and is carried with the treated wastewater to the clarifier, where the solids settle and separate from the treated effluent. At this point the treated wastewater may be discharged or recycled back to the filter medium for further treatment.

A fixed-film biological treatment process that employs rotating disks that move within the wastewater is referred to as a rotating biological contactor (RBC). Developed in the late 1960s, the RBC employs a plastic medium configured as disks and mounted on a horizontal shaft. The shafts are rotated slowly (1 to 2 rpm) by mechanical or compressed air drive. For a typical aerobic RBC, approximately 40 percent of the medium is immersed in the wastewater. Anoxic or anaerobic RBCs (far less common) are fully immersed in the wastewater. Wastewater flows through the medium by simple displacement and gravity. Biomass continuously sloughs from the disks, and some suspended biomass develops within the wastewater channels through which the disks rotate, making the addition of a secondary clarifier necessary. The rotation of the disks exposes the attached biomass to atmospheric air and wastewater. Oxygen is supplied by natural surface transfer to the biomass. Some oxygenation of the wastewater is also created by turbulence at the disk-water interface. The use of exposed and submerged stages in multiple tanks to create aerobic and anoxic conditions may be employed where nitrogen removal is required.

Commercially available modifications primarily address the media employed, the configuration of the tank, and the mechanical supporting systems (e.g., supplemental aeration, programmable cycling, etc.). Some FFS sludges are wasted directly by pumping of the clarifier, whereas others convey all excess solids back to the pretreatment stage (septic tank) for subsequent removal. Lightweight synthetic media have greater surface area and are easier to install. Numerous variations ranging from extruded foam to high-specific-surface PVC and other plastic shapes are available commercially.

SUMMARY OF INVENTION

In a first embodiment, the invention includes method of treating wastewater in a reactor having at least one aeration basin by channeling a volume of wastewater into the aeration basin. The volume of wastewater is then aerated with ambient for a sufficient time for the heterotrophic bacteria within the system to consume the bulk of the Chemical Oxygen Demand (COD) within the aeration basin; this is known as the COD removal stage. The necessary time is approximately 2 hours. Subsequent to the COD removal stage, nitrification is enhanced by increasing the partial pressure of carbon dioxide within the aeration basin; this is known as the nitrification stage. The nitrification stage continues for the remainder of the react cycle (approximately 5 hours). In a preferred embodiment, the partial pressure of carbon dioxide with the aeration basin is increased to about 1% $pCO_2$. In other embodiments, however, the $pCO_2$ is increased as high as about 17%.

In a second embodiment, the invention includes method of treating wastewater in a reactor having at least one aeration basin, an aeration source and a $CO_2$ source.

First a volume of wastewater enters the aeration basin. A first react cycle, having multiple sub-cycles, is then initiated. The sub-cycles include a first sub-cycle, wherein the volume of wastewater is aerated with a volume of gas from the aeration source; a sub-second cycle, wherein the volume of wastewater is aerated with a volume of a mixture of gas from the aeration source and the $CO_2$ source; a settling cycle, wherein the solids in the wastewater settle to the bottom of the aeration basin forming a precipitate layer and a supernate layer; and a supernate drain cycle, wherein the supernate is removed from the aeration and the precipitate layer remains within the aeration basin. Finally, a washout cycle is initiated wherein the precipitate layer is removed from the aeration basin. A portion of the precipitate layer, however, may be redirected back into the aeration basin and mixed with the incoming wastewater to "seed" the basin with live bacteria.

In a preferred embodiment, the volume of gas from the aeration source substantially comprises ambient air but the mixture of gas from the aeration source and the $CO_2$ source has a $pCO_2$ of about 1%. In other embodiments the mixture of gas from the aeration source and the $CO_2$ source has a $pCO_2$ as high as 17%.

The react cycle of the preferred embodiment is about 8 hours. In this embodiment, the first sub-cycle is about 2 hours, the second sub-cycle is about 5 hours, and the settling cycle is between about 45 minutes and 1 hour. The second sub-cycle begins after a predetermined Chemical Oxygen Demand level is established within the aeration basin. It is preferred that the bulk of the COD (more than 50%) be consumed prior to initiating the second sub-cycle. It is also preferred that a plurality of react cycles be performed prior to the washout cycle.

The preferred method allows for a shorter Solid Retention Time (SRT). Accordingly, the washout cycle is performed between about every 2 and 8 days. SRTs up to 20 days, however, are also contemplated.

Lastly, the invention includes a sequential batch reactor having at least one aeration basin, an aeration source in fluid communication with the aeration basin, and a $CO_2$ source in fluid communication with the aeration basin. The $CO_2$ source is adapted to provide an elevated partial pressure of $CO_2$ within the aeration basin. In a preferred embodiment, the $CO_2$ source is adapted to provide a partial pressure of $CO_2$ of between about 1% and 17% within the aeration basin.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
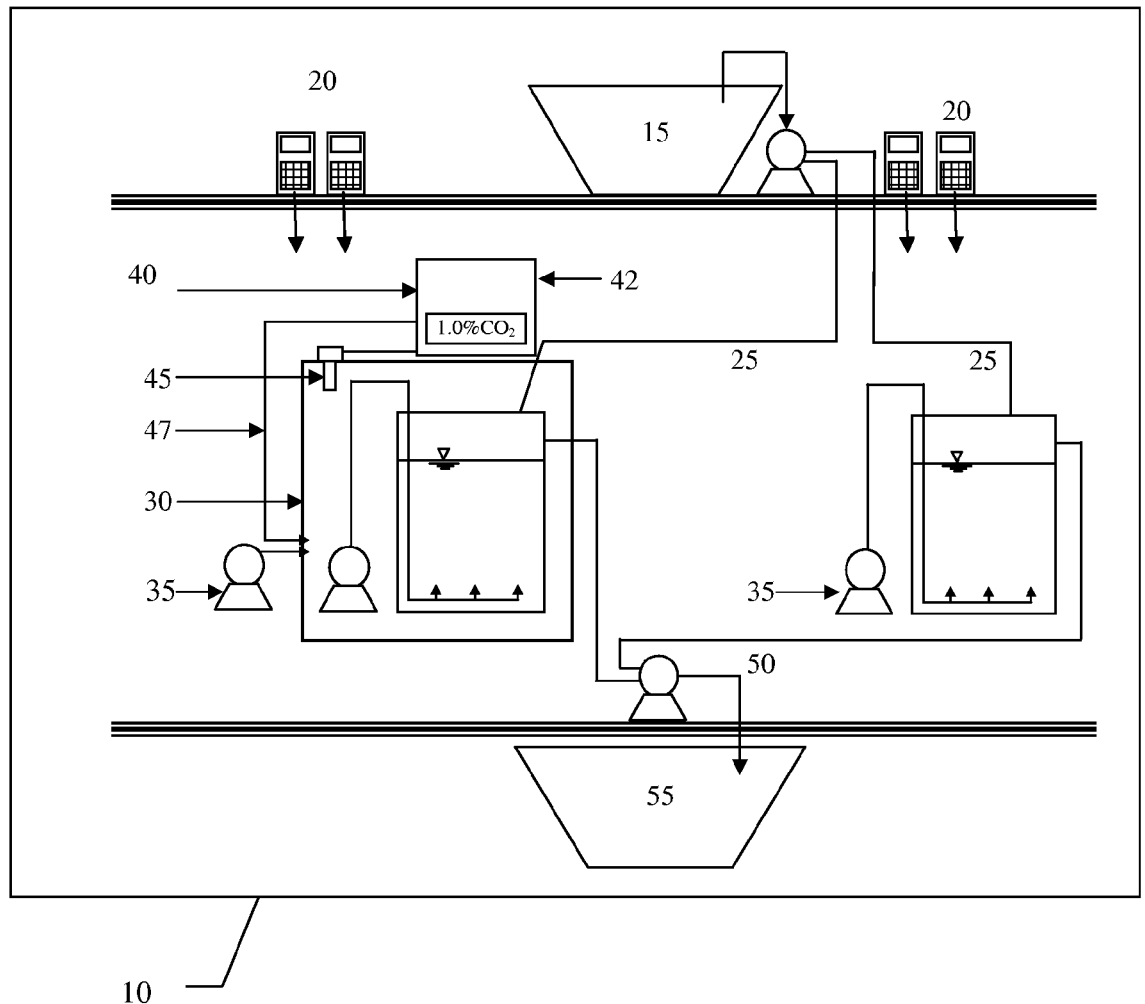
FIG. 1 is a diagram of the experimental SBR system that features $pCO_2$ control in the experimental reactor (left) and the control reactor (right).

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Nitrification is usually achieved in activated sludge systems by operating at a lengthy solids retention time (SRT), which relaxes the selective pressure and prevents the washout of the slowly growing nitrifying bacteria. The inventors hypothesized that the autotrophic, nitrifying bacteria in activated sludge systems grow slowly due to $CO_2$ limitation. To test this hypothesis, four experiments were conducted with two lab-scale sequencing batch reactors fed synthetic wastewater. The control reactor was supplied with ambient air (0.03% $CO_2$), while the experimental reactor was supplied with air containing elevated $pCO_2$ (1%). The initial experiment demonstrated that providing elevated $pCO_2$ for the entire 7-hour react cycle improved the nitrate formation rate, but degraded the solids settling performance. The remaining experiments demonstrated that providing elevated levels of $pCO_2$ for the final five hours of the 7-hour react cycle increased the nitrate formation rate by five-fold without affecting solids settling performance or COD removal efficiency during operation at lower SRT. Higher nitrate formation rates at lower SRT suggest that the nitrite oxidizing bacteria may be growing faster at elevated $pCO_2$.

Nitrification is the first step for the removal of nitrogen from wastewater, where ammonium ($NH_4^+$) is oxidized to nitrate ($NO_3^-$) by aerobic, autotrophic, nitrifying bacteria. These bacteria are thought to have slow growth rates and are sensitive to pH and temperature swings, making nitrification difficult to maintain in activated sludge systems (see Mobarry, B. K., Wagner, M., Urbain, V., Rittmann, B. E., and Stahl, D. A. (1996). "Phylogenetic probes for analyzing abundance and spatial organization of nitrifying bacteria." *Appl Environ Microbiol*, 62(6), 2156-62, which is incorporated herein by reference). In addition, their growth is also sensitive to the dissolved oxygen (DO) concentration, which requires elevated DO levels of 3 mg/L or more in the aeration basin. This high DO level requires high aeration rates, which can account for 50-70% of the energy costs of a wastewater treatment plant treating domestic wastewater. The slow growth rate and associated nitrification rate requires a lengthy solids retention time (SRT), as much as 20 days.

Here, the inventors show successful nitrification can be achieved at a low SRT without affecting the general performance of lab-scale activated sludge reactors (i.e. solids settling and COD removal), when elevated $pCO_2$ is provided during aeration. Nitrification is carried out by two groups of bacteria, the ammonia oxidizing bacteria (AOB) and the nitrite oxidizing bacteria (NOB). The growth of the nitrifying bacteria and rate of nitrification obey Monod kinetics and is a function of four parameters: N-reactant concentration (ammonia or nitrite), dissolved oxygen (DO), pH, and $pCO_2$. Traditionally, the DO is the only parameter under control and high rates of aeration are used to provide ample DO (>3 ppm). Nitrifying bacteria are autotrophic, which means they require carbon dioxide or bicarbonate as their carbon source for growth. Providing elevated $pCO_2$ provides higher concentration of $CO_2$, which stimulates the growth activity of the nitrifying bacteria.

This led the inventors to investigate whether nitrification in full-scale activated sludge systems may be improved by providing elevated $pCO_2$ to the aeration basin. The inventors also set out to determine if adequate nitrification could be possible by providing elevated $pCO_2$ and lower dissolved oxygen concentration in the aeration basin. Since the growth of the nitrifying bacteria and the nitrification rates obey Monod kinetics, the inventors hypothesized that elevated $pCO_2$ causes higher growth rate, while the lower DO will reduce their growth rate. Furthermor, reduction in the aeration rate lowers the dissolved oxygen concentration and may be an attractive method of reducing energy costs. It is estimated that aeration in the activated sludge system represents 50-70% of the energy costs of the entire wastewater treatment plant.

To demonstrate the effect of elevated $pCO_2$, a lab-scale reactor system with two sequencing batch reactors (SBR), as shown in FIG. 1, was designed and fabricated. As shown in FIG. 1, reactor system 10 comprises feed tank 15 in fluid communication with experimental tank 12 and control tank 14 through feed lines 25. Both tanks are aerated by air pumps 35. Experimental tank 12 is encased within chamber 30. $CO_2$ source 40 provides elevated $pCO_2$ to chamber 30 through line 47. The level of $pCO_2$ is monitored and controlled by $CO_2$ sensor 45 and $CO_2$ controller 42 respectively. Pump 37 provides experimental tank 12 with a mixture of gas comprising ambient air and elevated $pCO_2$. Both tanks drain to waste tank 55 via waste pump 50. Meters 20 are adapted to monitor the conditions in both tanks.

Room air (0.03% $CO_2$) was supplied to the control reactor, while the experimental reactor was supplied with air from within a chamber containing an elevated $pCO_2$ (1%). This chamber was a modified acrylic desiccator cabinet. The $pCO_2$ inside the chamber was maintained at 1.0%±0.1% using a $CO_2$ sensor and controller. The $CO_2$ was injected from a gas cylinder to the chamber and regulated by the $CO_2$ controller. Ambient air was also supplied to the chamber and mixed with the $CO_2$ gas. The mixed air with a concentration of 1.0% $CO_2$ was pumped into the experimental reactor. The control reactor was aerated directly with room air using an air pump. For the experimental system, two air pumps were used to introduce ambient air into the chamber and to introduce the mixed air from the chamber into the experimental reactor. The air injected into both reactors was dispersed with aquarium air stones. Dissolved oxygen and pH were measured periodically. Air was supplied to both reactors at a rate of 5 L/min to maintain DO concentrations above 3 mg/L during the entire react cycle and avoid proliferation of filamentous bacteria.

The reactors were operated with a working volume of 3 L and were seeded with 1 L of sludge from the nitrification basin of a full-scale activated sludge system, which was operated at an SRT of 22 days. For three cycles per day, both reactors were fed every cycle with 2 L of synthetic wastewater with the following composition (per L): 0.168 g $NaHCO_3$, 0.850 g $C_2H_3O_2Na.3H_2O$, and 3.33 mL of Nutrient Solution. The Nutrient Solution consisted of (per L): 32.10 g $NH_4Cl$, 22.65 g $NaH_2PO_4.2H_2O$, 27.00 g $MgSO_4.7H_2O$ 10.80 g KCl, 4.20 g $CaCl_2.2H_2O$, 0.90 g EDTA, 0.30 g Yeast Extract, and 90 mL of Trace Metal Solution. The Trace Metal Solutions consisted of (per L): 5.00 g $FeSO_4.7H_2O$, 0.05 g $H_3BO_3$, 1.60 g $CuSO_4.5H_2O$, 0.01 g KI, 5.00 g $MnCl_2.4H_2O$, 1.10 g $(NH_4)_6Mo_7O_{24}.4H_2O$, 2.20 g $ZnSO_4.7H_2O$, 0.05 g $CoCl_2.6H_2O$, and 50.0 g EDTA. For Examples 1 and 2, the synthetic wastewater and stock solutions were prepared with deionized water, while for Example 3, the synthetic wastewater and stock solutions were prepared with deionized water from a reverse osmosis system in the laboratory. The synthetic wastewater had the following characteristics: Alkalinity: 100 mg/L as $CaCO_3$, chemical oxygen demand (COD): of 400 mg/L as $O_2$, $NH_4^+$—N: 28 mg/L $NH_4^+$—N, and pH: 7.6.

The target hydraulic retention time (HRT) for both reactors was 0.5 days, which is similar to common values for WWTPs (see Metcalf & Eddy, I. (2003). *Wastewater Engineering: Treatment and Reuse.*, McGraw-Hill, New York, N.Y., which is incorporated herein by reference). The cycles were automatically operated with a controller that controlled the feed pump, waste pump, and air supply system. Each sequence of cycles was 8 hours with three distinct cycles: Fill for 10 minutes at the beginning of the React cycle; React cycle for 7 hours; and Settling and Decanting for 45 and 15 minutes, respectively. The reactors were operated at room temperature (20-22° C).

The significant results from the first three experiments, as described in Table 1, are reported. For Example 1, $CO_2$ was supplied during the entire React cycle, whereas for Examples 2 and 3 $CO_2$ was added during the last 5 hours of the React cycle. For all three experiments, the activated sludge biomass was challenged by decreasing the SRT from 8 days sequentially to 6, 4, and 2 days. Example 3 was designed to operate the reactors for a period equal to three times each target SRT, in order to evaluate the impact of $pCO_2$ on nitrification for extended operation.

TABLE 1

| Experiment | SRT (days) | Days Tested per SRT | Total Days Tested | Hours 1% $CO_2$ was supplied during React cycle |
|---|---|---|---|---|
| 1 | 8 | 8 | 11 | Entire 7 hours |
|  | 6 | 3 |  |  |
| 2 | 8 | 8 | 20 | Last 5 hours |
|  | 6 | 6 |  |  |
|  | 4 | 4 |  |  |
|  | 2 | 2 |  |  |
| 3 | 8 | 24 | 60 | Last 5 hours |
|  | 6 | 18 |  |  |
|  | 4 | 12 |  |  |
|  | 2 | 6 |  |  |

A fourth experiment was conducted with the lab reactor system described above, but the pH was held constant at seven through the addition of a phosphate buffer. The control reactor received air while the experimental received a gas mixture of 1.0% pCO$_2$ in air. A total of 0.042 moles of phosphate buffer was used.

This experiment was conducted based on guidelines established previously (see Water Environment Research Foundation (2003) "Methods for Wastewater Characterization in Activated Sludge Modeling." Prepared by H. Melcer, P. L. Dold, R. M. Jones, C. M. Byue, I. Takacs, H. D. Stensel, A. W. Wilsoon, P. Sun, and S. Bury, Report # 99-WWF-3, which is incorporated herein by reference). Ammonium chloride (NH$_4$Cl) was used as the sole nitrogen source (60 ppm as N) and 35 ml of MLSS was freshly collected from a local wastewater treatment plant. The addition of 1.8 g of NaHCO$_3$ was required for complete conversion of NH$_4^+$ to NO$_3^-$. An initial amount of 0.5 grams was used with periodic additions made during the experiment. This was necessary as the bicarbonate is consumed during the nitrification process and excessive bicarbonate interferes with the probes.

Data and samples were collected daily during the entire React cycle to determine NH$_4^+$ and NO$_3^-$ formation rates, pH, and DO. Samples of MLSS were collected daily at the end of the React cycle for settling evaluation and biomass analysis.

Ammonium and NO$_3^-$ concentrations (expressed as NH$_4^+$—N and NO$_3^-$—N, respectively) were measured every 30 minutes during the React cycle to determine nitrification rates using ion selective electrodes (Ammonium combination glass body electrode and Nitrate combination glass body electrode, Cole-Parmer® 27502-31) and ion. The ion selective electrodes were calibrated daily before use. The ammonium electrode used a 0.1M NaCl filling solution and was calibrated with a 1,000 mg/L NH$_4^+$—N standard solution (prepared in the laboratory with reagent-grade NH$_4$Cl) and a 5M NaCl Ionic Strength Adjuster (ISA). The nitrate electrode used a 0.1M (NH$_4$)$_2$SO$_4$ filling solution and was calibrated with a 1,000 mg/L NO$_3^-$—N standard solution (prepared in the laboratory with reagent-grade NaNO$_3$) and a 1M NaSO$_4$ ISA prepared in the laboratory. The slope of the measurements during the React cycle was used to determine the nitrate formation rate in each reactor.

Samples for TSS, volatile suspended solids (VSS), and COD analysis were collected once per day from the mixed liquor during the last 15 minutes of the React cycle. For the solids samples, 45 mL of MLSS was collected and transferred to 50 mL conical tubes and stored at 4° C. The sludge settling performance was evaluated by allowing 100 mL of MLSS collected at the end of the React cycle to settle in a graduated cylinder for 30 minutes and recording the sludge blanket volume. The measurements of the TSS measurement and settled sludge blanket volume were then used to calculate the sludge volume index (SVI). The TSS and VSS were measured in triplicate according to Standard Methods for the Examination of Water and Wastewater Analysis (see American Public Health Association. (1998). *Standard Methods for the Examination of Water and Waste Water*, United Book Press, Inc., Baltimore, which is incorporated herein by reference) sections 2540D and 2540E respectively. Samples for COD analysis were withdrawn from both reactors (10 mL of MLSS) at the end of the React cycle and settled for 30 minutes.

Successively, the supernatant was filtered with a 25 mm syringe filters with a 0.2 mm pore size. Filtered samples were stored in 15 mL conical tubes at −20° C. Later determination of COD was performed using the Reactor Digestion Method 8000 (see Jirka, A. M., and Carter, M. J. (1975). "Micro semi-automated analysis of surface and wastewaters for chemical oxygen demand." *Anal Chem*, 47(8), 1397-1402, which is incorporated herein by reference) for the COD range or 3-150 mg/L as Oxygen. The vials used for this procedure (Digestion solution for COD 0-150 mg/L as Oxygen range) were mixed with 2 mL of sample as indicated in the Method 8000 and digested for 2 hours at 150° C. in a digital reactor block DRB200. Vials were placed in a rack for cooling down to room temperature (~21° C.). A portable spectrophotometer adjusted to a wavelength of 420 nm (program 430 COD LR) as indicated by the Method 8000 was used to read the COD concentrations of the samples. A vial mixed with 2 mL of deionized water was used as a blank and additional vials each mixed with 300 mg/L as Oxygen standard solution at different dilutions were digested to check the calibration curve of the spectrophotometer with defined COD concentrations. The effluent COD concentration was compared to the initial COD concentration of 267 mg/L as Oxygen corresponding to two thirds of the COD in the synthetic wastewater (400 mg/L as O$_2$) to obtain the COD removal efficiency.

Prior to experimental work a model was developed to predict the effect of CO$_2$ on the pH for a range of typical buffer capacities for activated sludge systems. Because the alkalinity was adjusted with NaHCO$_3$, a charge balance of the ions in solution contributing to alkalinity was used to derive the expression used in the model. Since the pH of the water was less than 9, the carbonate [CO$_3^{2-}$] was considered negligible. The charge balance was rearranged in order to make the [H$^+$] a function of [Na$^+$] and pCO$_2$ by using the carbonate system equilibrium equations and the water equilibrium constant, as indicated below:

$$[H^+] = -\frac{[Na^+] - \sqrt{[Na^+]^2 - 4(K_{a,1}K_H pCO_2 + K_w)}}{2} \quad (1)$$

Figure 2:
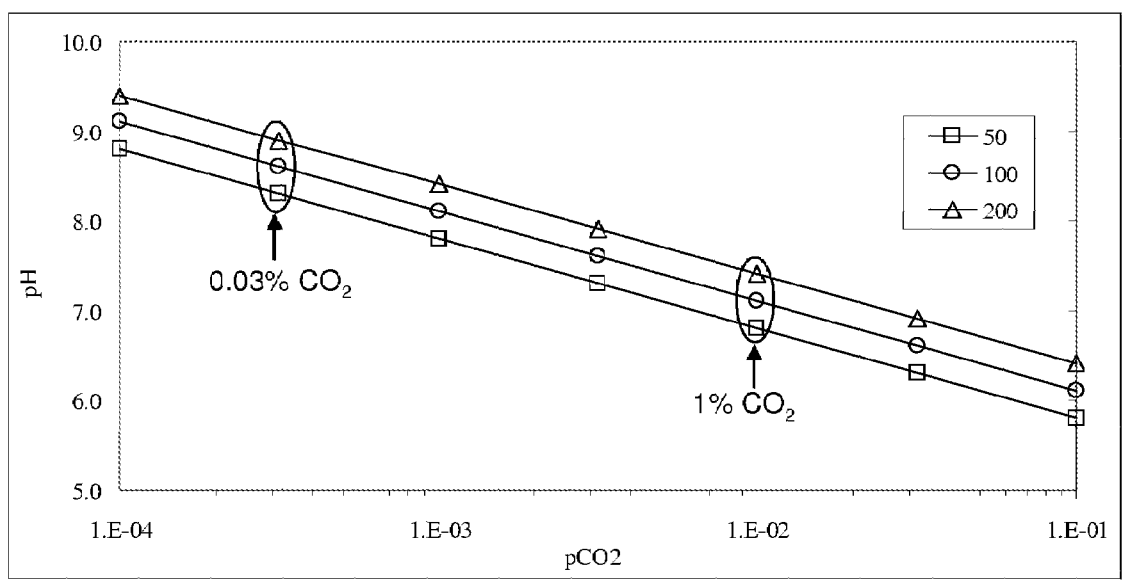
FIG. 2. is a graph of pH as a function of $pCO_2$ and alkalinity. The concentration in the control reactor (0.03% $CO_2$) and experimental reactor (1% $CO_2$) are highlighted. The alkalinity is expressed as the molar concentration of $Na^+$.

Values of pH (−log [H$^+$]) were calculated using Equation 1 for different values of pCO$_2$ and concentrations of NaHCO$_3$. FIG. 2 illustrates the pH obtained for three typical alkalinity values of wastewater (represented by the concentrations of the Na+ ions in solution). Alkalinities of 50, 100, and 200 mg/L as CaCO$_3$ correspond to 1, 2, and 4 meg/L and 0.001, 0.002, and 0.004 M Na$^+$, respectively. As shown, an increase in pCO$_2$ decreases pH for any given alkalinity. The model predicts a difference of 1.3 pH units between the control and the experimental reactors. For the alkalinity of the synthetic wastewater used in the experiment (100 mg/L as CaCO$_3$) the pH was predicted to be approximately 8.5 in the control reactor and 7.2 in the experimental reactor. Both pH values are within the range for typical activated sludge systems.

EXAMPLE 1

A positive impact of adding 1% CO$_2$ during aeration was evident during Example 1, where nitrate formation rates in the experimental reactor were more than five times greater than the control (data not shown). Maximum nitrate formation rates were 0.0040 and 0.0140 mg NO$_3^-$—N/L-min for the control and experimental reactors, respectively, while the average nitrate formation rates were 0.0020 and 0.0080 mg NO$_3^-$—N/L-min for the control and experimental reactors, respectively. Sludge blanket volumes were greater than 40 mL/100 mL and washout of biomass was only observed in the experimental reactor, whereas the control reactor demonstrated adequate solids settling performance. For both reactors, the COD removal efficiencies were greater than 90%. The pH in both reactors was consistent with the model predictions, with an average pH of 8.45 and 7.59 in the control and experimental reactors, respectively, which constituted a difference in the average pH of 0.86. Upon completion of the React cycle, a difference in the pH of 0.77 was observed between the reactors with an average pH of 8.68 in the control reactor and 7.91 in the experimental reactor. Although the pH values for the experimental reactor are slightly higher than the model predictions, a significant reduction in the pH of the experimental reactor due to the elevated $pCO_2$ was evident. In summary, when $CO_2$ was supplied throughout the 7-hour React cycle, the nitrate formation rates were significantly greater and the COD removal efficiency was unaffected, but the solids settling performance was impacted severely.

EXAMPLE 2

Based on the results of Example 1, the inventors altered the operational conditions to reduce the impact on solids settling by supplying elevated $pCO_2$ to the experimental reactor after the first two hours of every 7-hour React cycle. With this change in strategy, the inventors estimated that 2 hours would be ample time for the heterotrophic bacteria to consume the bulk of the COD (acetate) without being impacted by elevated $CO_2$ levels. The remaining five hours of the React cycle would provide sufficient time for nitrification. In order to challenge the biomass in both reactors with washout pressure, the SRT was decreased consecutively from 8 days to 6, 4, and 2 days.

Figure 3:
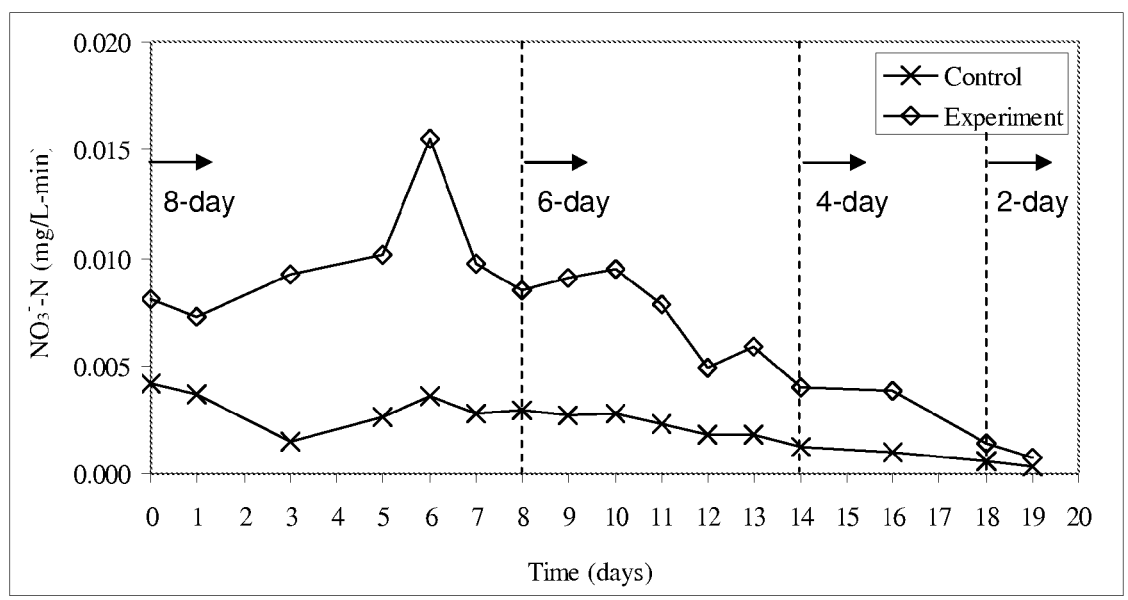
FIG. 3. is a graph of nitrate formation rates for Example 2. The start of each SRT period is indicated by an arrow.

The nitrate formation rates in both reactors during Example 2 are shown in FIG. 3.

As shown, the daily nitrate formation rate was always greater in the experimental reactor compared to the control reactor. Nitrate formation rates were much higher in the experimental reactor (maximum: 0.0160 mg $NO_3^-$—N/L-min; average: 0.0070mg $NO_3^-$—N/L-min) compared to the control reactor (maximum: 0.0040 mg $NO_3^-$—N/L-min; average: 0.0020 mg $NO_3^-$—N/L-min). For operation at lower SRT, the nitrate formation rates were lower in both reactors, which may indicate washout of the nitrifying biomass. Due to equipment failure, the rates of $NH_4^+$ oxidation were not measured. Peak sludge blanket volumes greater than 40 mL/100 mL were observed twice in the control reactor whereas the experimental reactor showed adequate settling performance ($\leq$33 mL/100 mL). The COD removal efficiencies were greater than 90% throughout the experiment in both reactors. Similar to Example 1, the average pH at the beginning of the React cycle was consistent with the model predictions with values of 8.40 and 8.32 in the control and experimental reactors respectively. By the end of the React cycle, the average pH values were 8.78 and 8.07 in the control and experimental reactors, respectively, which were consistent with the results from Example 1. In summary, the results for Example 2 suggest that the nitrifying bacteria grew faster when provided 1% $CO_2$ and were able to maintain nitrification at a lower SRT without affecting the general performance of the system (i.e. solids settling and COD removal efficiency).

EXAMPLE 3

Figure 4:
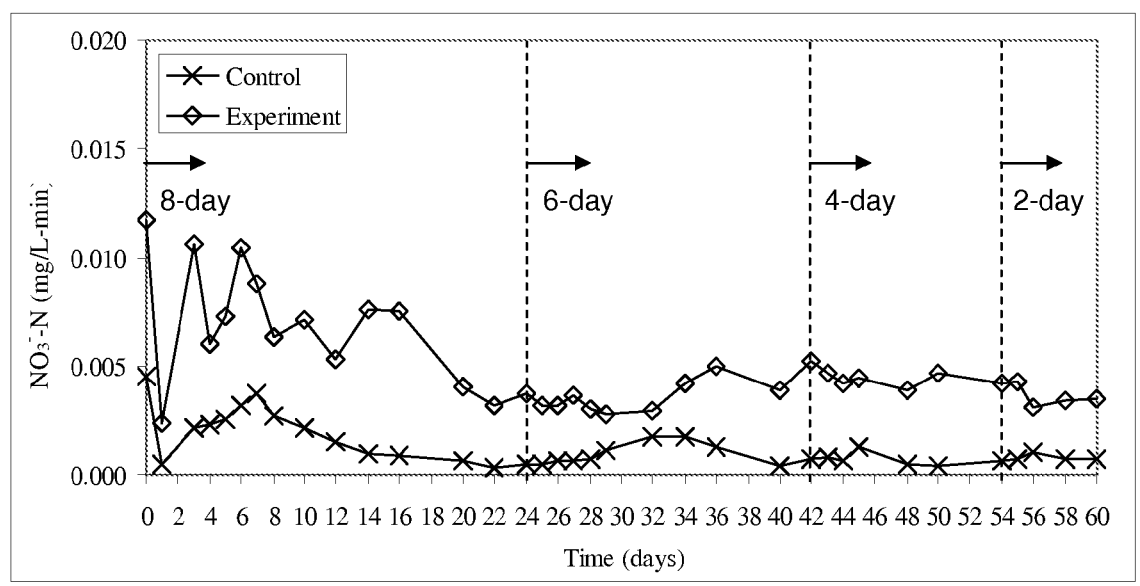
FIG. 4. is a graph of nitrate formation rates for Example 3. The start of each SRT period is indicated by an arrow.

To confirm the results from Example 2, a final experiment was designed with the same operational parameters, but the operation at a target SRT was lengthened for a period equal to three times each SRT. This experimental design provided sufficient time for the biomass to acclimate to each target SRT. FIG. 4 presents the nitrate formation rates in both reactors during Example 3. Similar to Example 2, the daily nitrate formation rate in experimental reactor was greater than the control reactor. Maximum nitrate formation rates were 0.0050 and 0.0120 mg $NO_3^-$—N/L-min for the control reactor and experimental reactor, respectively, which were slightly lower compared to Example 2. For both experiments, the maximum nitrate formation rates were observed during operation at an 8-day SRT, which the inventors attribute to high levels of nitrifying bacteria in the inoculum. Average nitrate formation rates were 0.0010 and 0.0050 mg $NO_3^-$—N/L-min for the control and experimental reactors, respectively. These results are consistent with the results of Example 2 and provide additional evidence that nitrification is possible at lower SRT when elevated $pCO_2$ is provided during aeration and the biomass is allowed to acclimate to the lower SRT.

Specific nitrate formation rates (mg $NO_3^-$—N/g VSS-min) were determined by using Equation 2, which normalized the nitrate formation rate to the VSS concentration.

$$\frac{mgNO_3^- - N}{gVSS \cdot min} = \frac{NO_3^- \text{ formation rate } (mgNO_3^- - N/L \cdot min)}{VSS(mg/L)/(1000mg/g)} \quad (2)$$

Figure 5:
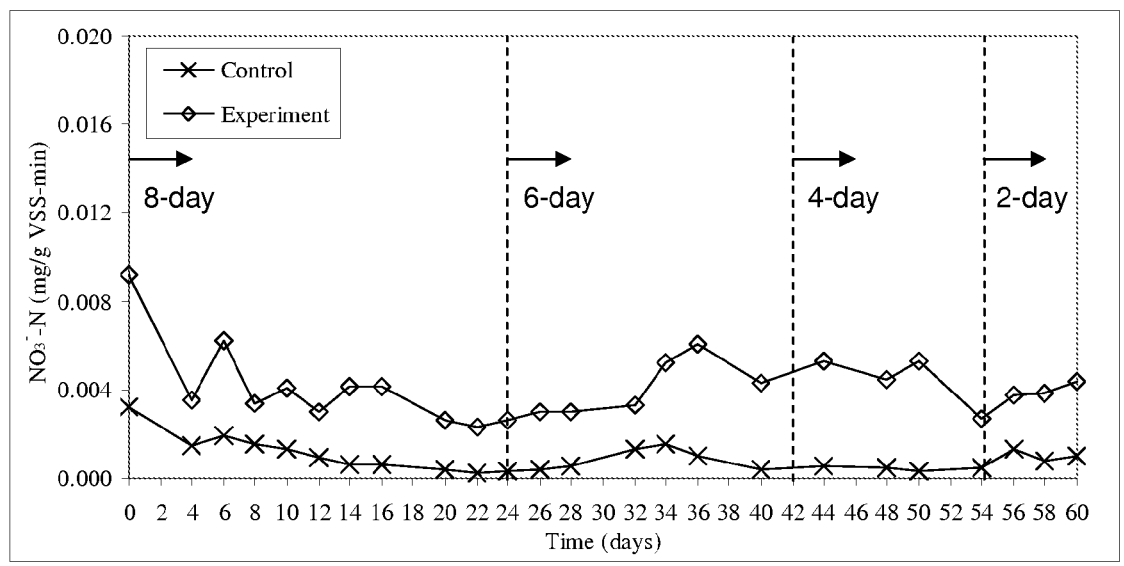
FIG. 5 is a graph of specific nitrate formation rates for Example 3. The start of each SRT period is indicated by an arrow.

As shown in FIG. 5, the specific nitrate formation rates were greater in the experimental reactor compared to the control reactor. Beyond day 20, the specific nitrate formation rates were very low in the control reactor with two periods (days 32-6 and day 56) exhibiting increases. For both reactors, the maximum specific nitrate formation rates were measured early in the experiment during operation at an 8-day SRT. The maximum specific nitrate formation rates were 0.0032 and 0.0092 mg $NO_3^-$—N/L-min for the control and experimental reactors, respectively. The average specific nitrate formation rates were greater in the experimental reactor (Table 2) compared to the control reactor for each operational period. An examination of the coefficient of variance for each operational period suggests stable performance for the experimental reactor beyond the 8-day SRT. A comparison of the average specific nitrate formation rates over the course of the entire experiment shows a four-fold advantage in the experimental reactor (0.0009 and 0.0041 mg $NO_3^-$—N/L-min for control and experimental, respectively). Overall, the results from Example 3 indicate a significant positive impact of elevated $pCO_2$ on the specific nitrate formation rates during operation at lower SRT.

TABLE 2

| SRT | Control | | | Experiment | | | Ave.Exp/ |
|---|---|---|---|---|---|---|---|
| (days) | Average | SD | COV | Average | SD | COV | Ave.Con |
| 8 | 0.0011[a] | 0.0009 | 78% | 0.0041 | 0.0020 | 49% | 3.727 |
| 6 | 0.0008 | 0.0005 | 64% | 0.0039 | 0.0013 | 33% | 4.875 |
| 4 | 0.0004 | 0.0001 | 25% | 0.0050 | 0.0005 | 10% | 12.500 |
| 2 | 0.0009 | 0.0003 | 39% | 0.0036 | 0.0007 | 20% | 4.000 |
| All | 0.0009 | 0.0007 | 73% | 0.0041 | 0.0015 | 37% | 4.556 |

Both reactors had similar average TSS and % VSS values during the 8-day-SRT period (control: 1,696 mg TSS/L and 92% VSS; experiment: 1,803 mg TSS/L and 92% VSS). During the 6-day-SRT period, a significant difference was observed (control: 1,456 mg TSS/L, 87% VSS; experiment: 963 mg TSS/L, 95% VSS). The control reactor was significantly impacted by the poor settling performance and washout of biomass during this period, whereas the experimental reactor showed lower, but stable solids concentrations. During the 4-day SRT period, the average solids concentration in the control reactor was slightly reduced to 1,350 TSS/L and 87% VSS, while a recovery was observed in the experimental reactor with a solids concentration of 1,170 TSS/L and 92% VSS. Finally, during the 2-day SRT period, a reduction in the solids concentration was observed in both reactors with 864 TSS/L and 92% VSS in the control, and 931 TSS/L and 92% VSS in the experimental reactor. Despite the reduction of the SRT and the poor solids settling performance observed, the biomass concentration in the experimental reactor remained fairly constant throughout the experiment, while the control reactor showed differences in each period.

The settling performance during Example 3 was evaluated by the use of the sludge volume index (SVI). An SVI value greater than 150 mL/g TSS indicates poor settling and the possible proliferation of filamentous bacteria. A comparison of the SVI for both reactors during Example 3 revealed better overall settling performance in the experimental reactor, as well as a better ability to recover from the reduction of the SRT (data not shown). For the control reactor, the maximum SVI was 636 mL/g TSS, which was greater than the maximum SVI in the experimental reactor of 446 mL/g TSS. Similarly, the average SVI for the control (254 mL/g TSS) was higher than the experimental reactor (210 mL/g TSS). Poor settling was observed in the control reactor from day 6 to day 50 when settling performance recovered. For the control reactor, approximately 100 mL MLSS per 8-hour cycle was unintentionally wasted on days 27 through 29 and days 32 through 38 with corresponding SVI values that were greater than 300 mL/g SS. This value is twice the value reported for biomass washout, which highlights the limitations of using an SBR system to fully represent full-scale systems (Metcalf & Eddy 2003). During these periods of poor settling, bubbles were observed in the rising sludge blanket and may indicate denitrification. Additionally, viscous bulking, as suggested by the jelly-like appearance of the MLSS, was associated with the high SVI values observed and washout of biomass.

The settling performance of the experimental reactor was acceptable throughout the experiment except for the 6-day-SRT period (days 25 to 42), when poor settling and bulking problems were observed in both reactors. Although SVI values were above 150 mL/g TSS during approximately 60% of the experiment, washout of biomass and viscous bulking were not observed in the experimental reactor. Foaming was only observed during the poor settling period (days 30 to 40). The reduction of the SRT from 6 days to 4 days on day 42 and the subsequent absence of foaming may indicate that the foaming was due to the slow growth of foam-causing microorganisms such as *Nocardia* and *Microthrix* (Pitt and Jenkins 1990). Overall, these results indicate a positive impact on settling by providing elevated $pCO_2$ in the experimental reactor after the first 2 hours of the React cycle.

The $NH_4^+$ concentrations in the supernatant only presented a slight difference between both reactors during the 8-day-SRT period with average concentrations in the supernatant of 3.2 and 2.0 mg $NH_4^+$—N/L in the control and experimental reactors, respectively. However no significant difference was observed over time suggesting that elevated $pCO_2$ does not have a significant impact on ammonia oxidizing bacteria for the range of SRT evaluated.

Nitrate concentrations for both reactors were low throughout the experiment. Low levels of nitrate in the supernatant for both reactors and the high SVI values may indicate that denitrification occurred during the settling period. However, the average concentration in the experimental reactor was twice the average concentration in the control reactor (data not shown). Nitrate concentrations did not exceed 10 mg $NO_3^-$—N/L in the experimental reactor.

In both reactors, no significant impact of elevated $pCO_2$ and low SRT operation was observed in COD removal efficiencies and supernatant concentrations. Both reactors showed the same trends and had comparable values meeting the required removal efficiency of COD for secondary treatment (90%), and the supernatant concentrations were always below 30 mg/L as $O_2$, indicating adequate performance of the system. Even though the experimental reactor showed slightly higher COD removal efficiencies, they were not significant.

Similar to Examples 1 and 2, the average pH was 8.45 for both reactors at the beginning of the React cycle, which was consistent with the model predictions. By the end of the React cycle, the average pH values were 8.66 and 7.85 in the control and experimental reactors, respectively, which were consistent with the results from Examples 1 and 2.

Overall, the results from Example 3 suggest that nitrification is possible at low SRTs when elevated $pCO_2$ is supplied during aeration, which validates these hypothesis. In addition, the general performance (i.e. COD removal and solids settling) of the activated sludge system was not impacted by the elevated $pCO_2$.

EXAMPLE 4

Figure 6:
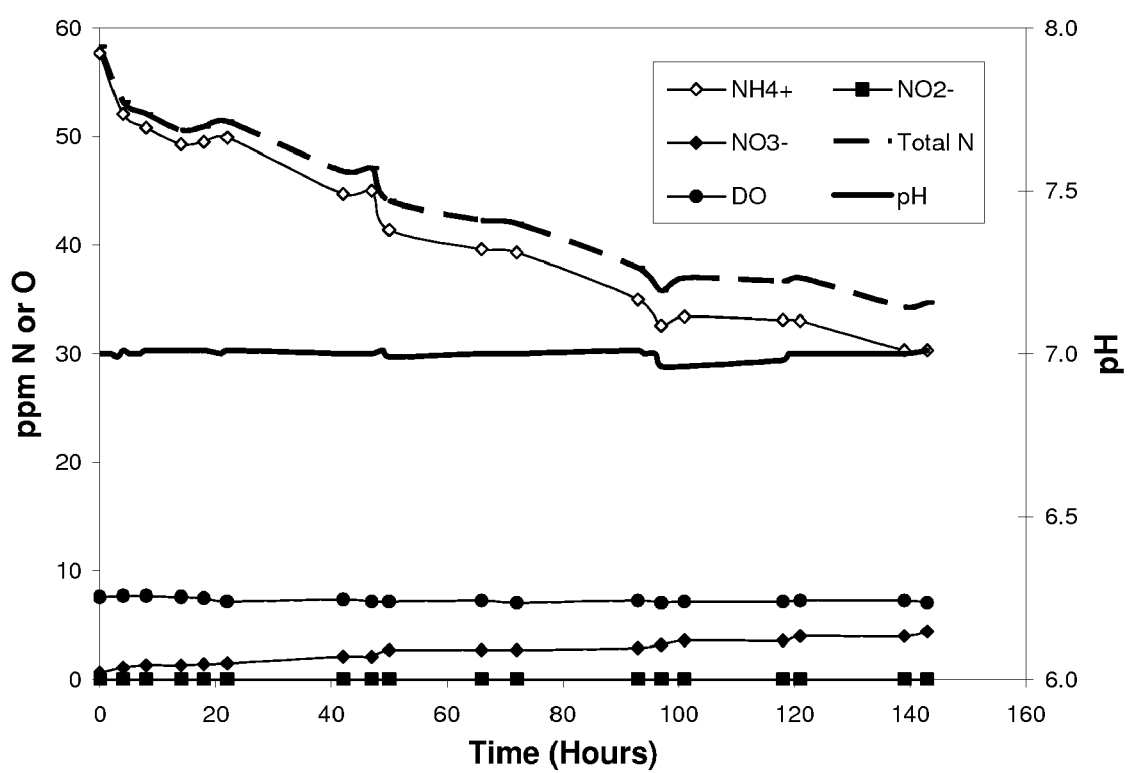
FIG. 6 is a graph of ammonia utilization, nitrite and nitrate formation rates, pH, DO, and Total Nitrogen for the Control Reactor of Example 4.
Figure 7:
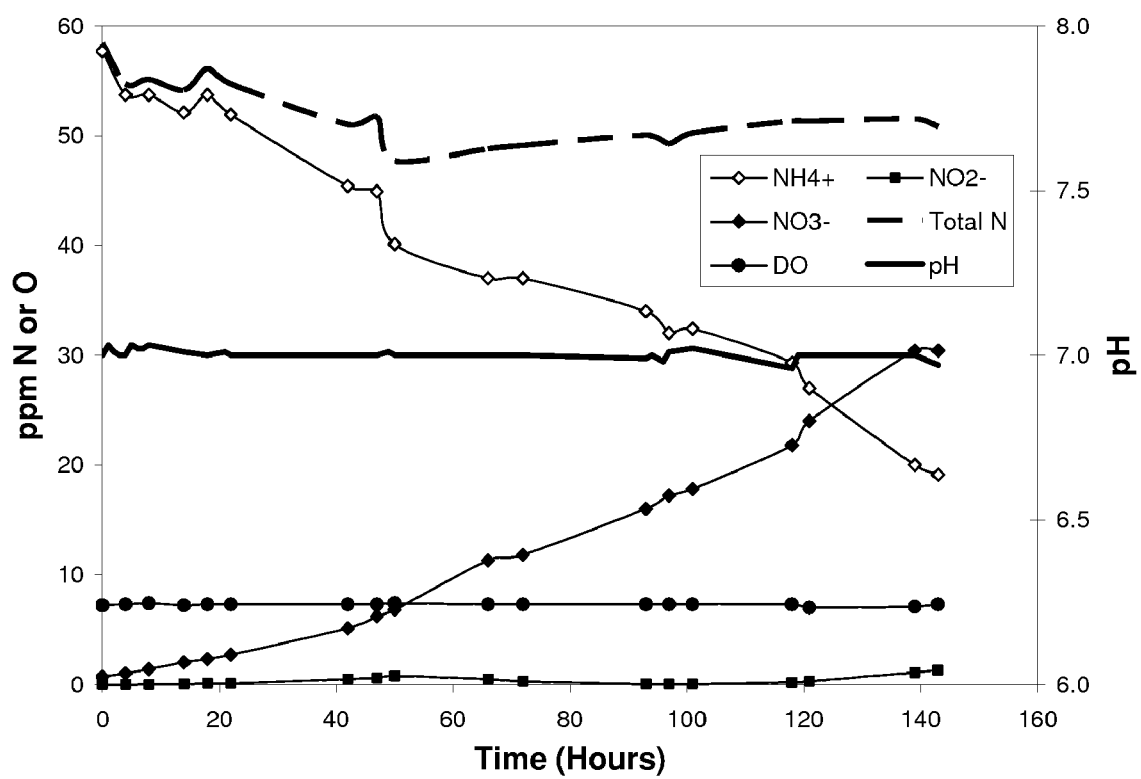
FIG. 7 is a graph of ammonia utilization, nitrite and nitrate formation rates, pH, DO, and Total Nitrogen for the Exampleal Reactor of Example 4.

The results from Example 4 are presented in FIGS. 6 and 7. The study was begun with approximately 58 ppm of nitrogen. $NH_4^+$, $NO_2^-$, $NO_{3-}$, pH, and dissolved oxygen (DO) were measured daily. The pH was maintained between 6.95 and 7.05 with most measurements being 7. Dissolved oxygen was relatively constant and non-limiting.

The control reactor continued to lose $NH_4^+$ although there was little evidence of conversion to $NO_3^-$. The conversion rate was calculated to be 0.0308 ppm N per hour. This conversion rate remained relatively constant throughout the experiment. By contrast, the experimental reactor demonstrated a conversion rate of 0.213 ppm N per hour, which represents a 6.9 fold increase. Also of note is the conversion rate increased from 0.121 ppm N per hour for the first 42 hours to 0.251 ppm N per hour for the next 101 hours.

A loss of ammonia was observed in both reactors but was more pronounced in the control reactor. This is probably due to metabolism associated with biomass decay. Some of the ammonia loss may be due to stripping, but this would have been minimal with a solution held at a constant pH of 7.

The results of the fourth experiment demonstrate clearly that cause of improved nitrification can be attributed to elevated $pCO_2$ and not the lower pH due to elevated $pCO_2$. In addition, the dramatic improvement in the nitrification rate (6.9 fold increase) is consistent with the results from the experiments where pH was not controlled.

Nitrification

These results are consistent with the findings of other researchers, which have found a positive effect of elevated $pCO_2$ on Byong-Hee, J., Yasunori, T., and Hajime, U. (2000). "Stimulating Accumulation of Nitrifying Bacteria in Porous Carrier by Addition of Inorganic Carbon in a Continuous-Flow; Denecke, M., and Liebig, T. (2003). "Effect of carbon dioxide on nitrification rates." *Bioprocess Biosyst Eng*, 25(4), 249-53; Gordon, L., and Paskins, A. (1982). "Influence of High Partial Pressure of Carbon Dioxide and/or Oxygen on Nitrification." *J. Chem Tech*, 32, 213-23; Sakairi, M. A., Yasuda, K., and Matsumura, M. (1996). "Nitrogen removal in seawater using nitrifying and denitrifying bacteria immobilized in porous cellulose carrier." *Water Science and Technology*, 34(7-8), 267-274; and Wett, B., Eladawy, A., and Becker, W. (2003). "Carbonate addition—an effective remedy against poor activated sludge settling properties and alkalinity conditions in small wastewater treatment plants." *Water Sci Technol*, 48(11-12), 411-7; which are incorporated herein by reference). Although nitrate formation rates have not been reported by these researchers, $NO_x$—N generation (mg/L) has been found to be approximately three times higher (1.5% $CO_2$ vs. 0% $CO_2$) after two hours of operation, which is similar to these results (Denecke and Liebig 2003). Additionally, Denecke and Liebig (2003) reported that the specific growth rate ($\mu_{obs}$) of mixed autotrophic and heterotrophic sludge increased 20% when the $pCO_2$ was elevated to approximately 1%. Other authors have suggested a positive impact of elevated $pCO_2$ on the specific growth rates of nitrifying bacteria (Bringmann 1961; Gordon and Paskins 1982).

Although the inventors did not evaluate the role of pH on the nitrate formation rate in the first three experiments, it is important to consider. The average pH for the control and experimental reactors in the first three experiments were 8.57 (s.d. 0.02) and 8.03 (s.d. 0.24), respectively. The pH of the experimental reactor was not considered inhibitory and the pH of both reactors was slightly higher than the optimal range of 7.5-8.0 (Metcalf & Eddy 2003). Although the specific growth rate of microorganisms is sensitive to pH, it is difficult to attribute the substantial increase in nitrate formation rates to a half-unit difference in pH. The results from the fourth experiment clearly show that the elevated $pCO_2$ is responsible for improved nitrification.

The results of all four experiments clearly demonstrate a positive effect of elevated $pCO_2$ on nitrate formation rates.

Solids Settling Performance

Operating at an elevated $pCO_2$ during aeration after the 2 first hours of the React cycle resulted in slightly better solids settling performance. During Example 3, the experimental reactor did not experience washout of the biomass although SVI values were greater than 150 mL/g for 60% of the time. In contrast, the control reactor lost 5-10% of the biomass per day during 10 days of the experiment, and a maximum SVI value of 636 mL/g was observed on day 32. A multi-layered sludge blanket was observed in the control reactor, whereas the experimental reactor demonstrated adequate solids settling characteristics. In contrast to the adequate solids settling performance observed in the experimental reactor during Examples 2 and 3, the poor solids settling observed in the same reactor during Example 1 suggests a positive effect of elevated $pCO_2$ only when supplied after 2 hours of the React cycle was complete. These results are consistent with previous reports by Wett et al. (2003), who found that the addition of bicarbonate was an effective remedy against poor settling in activated sludge systems for the removal of nitrogen from wastewater with high concentrations of $NH_4^+$.

Poor solids settling performance in the experimental reactor in Example 1 suggests a negative effect of supplying elevated $pCO_2$ while acetate and other nutrients are available. This may be favorable growth conditions for bacteria that consume both organic and inorganic carbon, despite DO levels greater than 3.0 mg/L as Oxygen. Researchers have identified such a bacteria as *Thiothrix* spp., a filamentous bacterium that converts bicarbonate to cell biomass, while exposed to acetate (Nielsen et al. 2000; Odintsova et al. 1993).

COD Removal Performance

Elevated $pCO_2$ did not significantly impact the removal efficiency of COD in the three experiments. COD removal efficiencies and concentrations in the supernatant were within the limits for secondary treatment of wastewater.

Conclusions

The inventors have demonstrated that successful nitrification can be achieved at a low SRT (i.e. less than 20 days) without affecting the general performance of lab-scale activated sludge reactors (i.e. solids settling and COD removal), when elevated $pCO_2$ is provided during aeration. This is significant, since is suggests that the nitrification in full-scale activated sludge systems may be improved by providing elevated $pCO_2$ to the aeration basin. The inventors also clearly demonstrated that elevated $pCO_2$ is the sole cause for improved nitrification and not the combination of elevated $pCO_2$ and lower pH due to the elevated $pCO_2$. In addition, these findings challenge the notion that nitrification is a slow process and the recommendations of a lengthy SRT for adequate nitrification in activated sludge systems.

These results also document the different effects of elevated $pCO_2$ on settling performance. The inventors observed bulking when elevated $pCO_2$ was supplied during the entire React cycle, which is consistent with recent findings that bulking of activated sludge was caused by abundant levels of obligate heterotrophic filamentous bacteria with a facultative chemolithoautotrophic type of metabolism (i.e. *Thiothrix* spp.). The improvement on solids settling performance when elevated $pCO_2$ was supplied after 2 hours within the React cycle is consistent with the previous results that identified inorganic carbon as a potential remedy to poor settling and bulking sludge problems in activated sludge systems.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of treating wastewater in a system having a nitrification stage, comprising:
    flowing a volume of wastewater into the nitrification stage; and
    increasing the partial pressure of $CO_2$ within the nitrification stage, wherein the partial pressure of $CO_2$ is greater than that of the atmosphere.

2. The method of claim 1, further comprising providing a COD removal stage for a predetermined time prior to increasing the partial pressure of $CO_2$ within the nitrification stage.

3. The method of claim 2 wherein the predetermined time for the COD removal stage is sufficient to allow heterotrophic bacteria within the system to consume the bulk of the Chemical Oxygen Demand.

4. The method of claim 2 wherein the predetermined time for the COD removal stage is about 2 hours.

5. The method of claim 1 wherein the partial pressure of carbon dioxide with the aeration basin is increased between about 1% and 17% $pCO_2$.

6. A method of treating wastewater, comprising:
    providing a reactor having at least one aeration basin, an aeration source and a $CO_2$ source;
    flowing a volume of wastewater into the aeration basin;
    providing a react cycle comprising;
    a first sub-cycle, wherein the volume of wastewater is aerated with a volume of gas from the aeration source;
    a second sub-cycle, wherein the volume of wastewater is aerated with a volume of a mixture of gas from the aeration source and the $CO_2$ source;

providing a settling cycle, wherein the solids in the wastewater settle to the bottom of the aeration basin forming a substantially solid precipitant layer and substantially fluid supernant layer;

providing a supernant drain cycle, wherein the supernant is removed from the aeration and the precipitant layer remains within the aeration basin; and providing a washout cycle, wherein the precipitant layer is removed from the aeration basin.

7. The method of claim 6 wherein the volume of gas from the aeration source substantially comprises ambient air.

8. The method of claim 6 wherein the mixture of gas from the aeration source and the $CO_2$ source has a $pCO_2$ between about 1% and 17%.

9. The method of claim 6 wherein the react cycle is about 7 hours.

10. The method of claim 9 wherein the first sub-cycle is about 2 hours.

11. The method of claim 9 wherein the second sub-cycle is about 5 hours.

12. The method of claim 9 wherein the settling cycle is about 1 hour.

13. The method of claim 6 wherein the second sub-cycle begins after a predetermined Chemical Oxygen Demand level is established within the aeration basin.

14. The method of claim 13 wherein the predetermined Chemical Oxygen Demand level in the aeration basin is greater than 50% Chemical Oxygen Demand.

15. The method of claim 6 wherein a plurality of cycles comprising a react cycle, a settling cycle and a supernant drain cycle is performed prior to the washout cycle.

16. The method of claim 15 wherein at least 2 of each of a react cycle, settling and supernant drain are performed per day.

17. The method of claim 6 wherein the solids retention time is between about 2 and 8 days.

18. The method of claim 6 wherein the solids retention time is less than 20 days.

* * * * *